US009550575B2

(12) United States Patent
Kshirsagar et al.

(10) Patent No.: US 9,550,575 B2
(45) Date of Patent: Jan. 24, 2017

(54) ON-BOARD GENERATION OF OXYGEN FOR AIRCRAFT PILOTS

(75) Inventors: Girish S. Kshirsagar, Overland Park, KS (US); Detlev Degenhardt, Lubeck (DE); Ashraf Sherif, Overland Park, KS (US)

(73) Assignee: B/E Aerospace, Inc., Wellington, FL (US)

( * ) Notice: Subject to any disclaimer, the term of this patent is extended or adjusted under 35 U.S.C. 154(b) by 787 days.

(21) Appl. No.: 13/481,095

(22) Filed: May 25, 2012

(65) Prior Publication Data

US 2013/0312744 A1    Nov. 28, 2013

(51) Int. Cl.
| A62B 7/14 | (2006.01) |
| A62B 18/02 | (2006.01) |
| A62B 7/00 | (2006.01) |
| A62B 7/02 | (2006.01) |
| A62B 7/08 | (2006.01) |
| A62B 9/00 | (2006.01) |
| B64D 13/02 | (2006.01) |
| B64D 11/00 | (2006.01) |
| B64D 13/06 | (2006.01) |

(52) U.S. Cl.
CPC ............... *B64D 13/02* (2013.01); *B64D 11/00* (2013.01); *A62B 7/14* (2013.01); *B64D 2013/0677* (2013.01); *B64D 2231/02* (2013.01); *Y02T 50/44* (2013.01); *Y02T 50/46* (2013.01)

(58) Field of Classification Search
CPC ............. A62B 7/08; A62B 7/14; A62B 21/00; B64D 2013/0677

USPC ......... 128/202.26, 204.21, 204.23; 95/8, 96; 96/108, 142–144
See application file for complete search history.

(56) References Cited

U.S. PATENT DOCUMENTS

| 4,651,728 A * | 3/1987 | Gupta ..................... A62B 7/14 |
| | | 128/201.28 |
| 4,681,602 A | 7/1987 | Glenn et al. |
| (Continued) | | |

FOREIGN PATENT DOCUMENTS

| CN | 101454204 A | 6/2009 |
| EP | 1106245 A2 | 6/2001 |
| (Continued) | | |

OTHER PUBLICATIONS

EPO, International Search Report and Written Opinion from International Application PCT/US2013/041710.
(Continued)

*Primary Examiner* — Jackie T Ho
*Assistant Examiner* — Joseph D Boecker
(74) *Attorney, Agent, or Firm* — Shumaker, Loop & Kendrick, LLP (57) ABSTRACT

The present invention provides a system and method for supplying and managing oxygen suited for use on-board an aircraft for providing breathable oxygen to pilots and cockpit crew. Components of the system work together to optimize oxygen utilization while reducing costs from maintenance and added weight of traditional pressurized gaseous cylinders. Components include a rapid oxygen supply for immediate use in emergency situations, an on-board oxygen generator (OBOG), a controller, a pulsed oxygen delivery subsystem that detects inhale/exhale phases and adapts to physiological requirements, and a breathing mask for each pilot and cockpit crew member.

7 Claims, 1 Drawing Sheet

(56) References Cited

U.S. PATENT DOCUMENTS

| | | | |
|---|---|---|---|
| 5,071,453 A * | 12/1991 | Hradek | A61M 16/101 95/19 |
| 5,131,225 A | 7/1992 | Roettger | |
| 5,185,014 A | 2/1993 | Prasad | |
| 5,299,568 A | 4/1994 | Forare et al. | |
| 5,343,859 A | 9/1994 | Kikut | |
| 5,383,449 A | 1/1995 | Forare et al. | |
| 5,390,666 A | 2/1995 | Kimm et al. | |
| 5,438,980 A | 8/1995 | Phillips | |
| 5,660,171 A | 8/1997 | Kimm et al. | |
| 5,709,732 A | 1/1998 | Prasad | |
| 5,711,787 A | 1/1998 | Neill et al. | |
| 5,809,999 A * | 9/1998 | Lang | A62B 7/14 128/200.24 |
| 5,881,717 A | 3/1999 | Isaza et al. | |
| 5,917,135 A * | 6/1999 | Michaels | B01D 53/047 95/101 |
| 5,988,165 A * | 11/1999 | Richey, II | A61M 16/10 128/204.22 |
| 6,089,230 A | 7/2000 | Barker et al. | |
| 6,290,759 B1 | 9/2001 | Fenner et al. | |
| 6,319,305 B1 * | 11/2001 | Phillips | A62B 7/14 96/134 |
| 6,491,739 B1 | 12/2002 | Crome et al. | |
| 6,604,558 B2 | 8/2003 | Sauer | |
| 6,726,558 B1 | 4/2004 | Meirav | |
| 6,729,359 B2 | 5/2004 | Jones | |
| 6,739,359 B2 | 5/2004 | Jones et al. | |
| 6,846,347 B2 * | 1/2005 | Phillips | A62B 7/14 95/130 |
| 6,866,701 B2 | 3/2005 | Meirav | |
| 6,904,913 B2 * | 6/2005 | Aylsworth | A61M 16/10 128/204.18 |
| 6,955,710 B2 * | 10/2005 | Lessi | A62B 7/14 128/204.18 |
| 6,989,044 B2 | 1/2006 | Zhang et al. | |
| 6,997,970 B2 * | 2/2006 | Crome | A62B 7/14 95/130 |
| 7,048,231 B2 | 5/2006 | Jones | |
| 7,081,153 B2 | 7/2006 | Leigh et al. | |
| 7,087,804 B2 | 8/2006 | O'Rear | |
| 7,144,445 B2 | 12/2006 | Gueret et al. | |
| 7,152,494 B2 * | 12/2006 | Peacey | A62B 27/00 73/865.9 |
| 7,152,635 B2 | 12/2006 | Moravec et al. | |
| 7,172,156 B1 | 2/2007 | Jones | |
| 7,172,157 B2 | 2/2007 | Jones | |
| 7,204,868 B2 | 4/2007 | Snow, Jr. | |
| 7,273,507 B2 | 9/2007 | Schwalm | |
| 7,306,644 B2 | 12/2007 | Leigh et al. | |
| 7,374,601 B2 | 5/2008 | Bonchonsky et al. | |
| 7,442,230 B2 | 10/2008 | Snow, Jr. | |
| 7,442,238 B2 | 10/2008 | Rittner et al. | |
| 7,445,660 B2 | 11/2008 | Hart et al. | |
| 7,481,214 B2 | 1/2009 | Eilers | |
| 7,509,968 B2 | 3/2009 | Surawski | |
| 7,517,388 B2 | 4/2009 | Jensvold | |
| 7,550,031 B2 * | 6/2009 | Hunter | B01D 53/04 128/204.18 |
| 7,556,670 B2 * | 7/2009 | Aylsworth | B01D 53/0454 128/204.21 |
| 7,592,284 B2 | 9/2009 | Zaki et al. | |
| 7,608,131 B2 | 10/2009 | Jensen | |
| 7,625,434 B2 | 12/2009 | Tom et al. | |
| 7,637,280 B2 | 12/2009 | Gaget et al. | |
| 7,645,324 B2 | 1/2010 | Rode et al. | |
| 7,694,674 B2 * | 4/2010 | Crome | A62B 21/00 128/202.26 |
| 7,717,983 B2 | 5/2010 | Semmere et al. | |
| 7,794,522 B2 * | 9/2010 | Bliss | B01D 53/0407 128/204.26 |
| 7,900,627 B2 * | 3/2011 | Aylsworth | A61M 16/10 128/204.22 |
| 8,210,175 B2 * | 7/2012 | Meckes et al. | 128/205.12 |
| 9,089,721 B1 * | 7/2015 | Horstman | A62B 7/14 |
| 2002/0014237 A1 * | 2/2002 | Richey, II | A61M 16/10 128/203.25 |
| 2002/0088504 A1 | 7/2002 | Sauer | |
| 2003/0145726 A1 | 8/2003 | Gueret et al. | |
| 2003/0205132 A1 | 11/2003 | Lessi et al. | |
| 2003/0233936 A1 | 12/2003 | Crome | |
| 2004/0000353 A1 | 1/2004 | Jones | |
| 2004/0065778 A1 | 4/2004 | Jones | |
| 2004/0112211 A1 | 6/2004 | Meirav | |
| 2004/0187613 A1 * | 9/2004 | Peacey | A62B 27/00 73/865.9 |
| 2004/0245390 A1 * | 12/2004 | Meckes | A62B 7/14 244/118.5 |
| 2004/0259961 A1 | 12/2004 | O'Rear | |
| 2005/0092177 A1 | 5/2005 | Bonchonsky et al. | |
| 2005/0115404 A1 | 6/2005 | Leigh et al. | |
| 2005/0160909 A1 | 7/2005 | Meirav | |
| 2005/0173017 A1 | 8/2005 | Moravec et al. | |
| 2005/0247197 A1 | 11/2005 | Snow | |
| 2005/0263005 A1 | 12/2005 | Rittner et al. | |
| 2006/0011063 A1 | 1/2006 | Zhou | |
| 2006/0021652 A1 | 2/2006 | Surawski | |
| 2006/0117950 A1 | 6/2006 | Lessi | |
| 2006/0117956 A1 | 6/2006 | Schwalm | |
| 2006/0151669 A1 | 7/2006 | Jones | |
| 2006/0169142 A1 | 8/2006 | Rode et al. | |
| 2006/0243133 A1 | 11/2006 | Hart et al. | |
| 2006/0243184 A1 | 11/2006 | O'Rear | |
| 2006/0243859 A1 | 11/2006 | Lessi et al. | |
| 2006/0243950 A1 | 11/2006 | O'Rear | |
| 2007/0000380 A1 | 1/2007 | Leigh et al. | |
| 2007/0023577 A1 | 2/2007 | Jones | |
| 2007/0054610 A1 | 3/2007 | Jensen | |
| 2007/0062371 A1 | 3/2007 | Eilers | |
| 2007/0144347 A1 | 6/2007 | Snow | |
| 2007/0157803 A1 | 7/2007 | McNeil et al. | |
| 2007/0209509 A1 | 9/2007 | Zaki et al. | |
| 2007/0261554 A1 | 11/2007 | Jensvold | |
| 2008/0047426 A1 * | 2/2008 | Dolensky | A62B 21/00 95/22 |
| 2008/0060523 A1 | 3/2008 | Tom et al. | |
| 2009/0071340 A1 | 3/2009 | Surawski | |
| 2009/0145428 A1 * | 6/2009 | Sward | A61M 16/10 128/202.26 |
| 2009/0320836 A1 * | 12/2009 | Baker, Jr. | A61M 16/12 128/203.14 |
| 2010/0024649 A1 | 2/2010 | Semmere et al. | |
| 2010/0064886 A1 | 3/2010 | Surawski et al. | |
| 2013/0042870 A1 * | 2/2013 | Peacey et al. | 128/205.12 |
| 2014/0137859 A1 * | 5/2014 | Wilkinson | A61M 16/0051 128/202.26 |
| 2014/0342648 A1 * | 11/2014 | Hart | B64D 13/06 454/76 |
| 2015/0157883 A1 * | 6/2015 | Armatorio | B64D 37/32 128/202.26 |

FOREIGN PATENT DOCUMENTS

| | | |
|---|---|---|
| EP | 1108458 A1 | 6/2001 |
| EP | 1338324 A2 | 8/2003 |
| EP | 1358911 A1 | 11/2003 |
| EP | 1375349 A1 | 6/2005 |
| EP | 1669290 A1 | 6/2006 |
| EP | 1737729 A2 | 1/2007 |
| EP | 1839726 A1 | 10/2007 |
| EP | 1857166 A1 | 11/2007 |
| EP | 2092962 A1 | 8/2009 |
| EP | 2163476 A2 | 3/2010 |
| GB | 2255509 A | 11/1992 |
| WO | 9707053 A1 | 2/1997 |
| WO | 03068317 A1 | 8/2003 |
| WO | 2004002826 A1 | 1/2004 |
| WO | 2004033601 A2 | 4/2004 |
| WO | 2004113472 A2 | 12/2004 |
| WO | 2005002966 A1 | 1/2005 |
| WO | 2005002968 A1 | 1/2005 |
| WO | 2005063362 A1 | 7/2005 |

(56) References Cited

FOREIGN PATENT DOCUMENTS

| WO | 2005115123 A2 | 12/2005 |
| WO | 2005118073 A2 | 12/2005 |
| WO | 2006020286 A2 | 2/2006 |
| WO | 2006074343 A2 | 7/2006 |
| WO | 2006079782 A2 | 8/2006 |
| WO | 2006116125 A2 | 11/2006 |
| WO | 2008097569 A1 | 8/2008 |
| WO | 2008138930 A2 | 11/2008 |
| WO | 2009106936 A2 | 9/2009 |

OTHER PUBLICATIONS

EPO, International Search Report in International Patent No. PCT/US2013/041674 dated Oct. 22, 2013.
EPO, International Search Report and Written Opinion from International Application PCT/US2013/041245 dated Dec. 4, 2013.
Honeywell, On-Board Inert Gas Generation System (OBIGGS), website, Sep. 13, 2011, 1 page.
Honeywell, On-Board Inert Oxygen Generating System (OBOGS), website, Sep. 13, 2011, 1 page.
Chinese Search Report, 2 pages, from App. No. 201380027019.9.

\* cited by examiner

ON-BOARD GENERATION OF OXYGEN FOR AIRCRAFT PILOTS

BACKGROUND

This invention generally relates to a system and method for providing regulated flow of oxygen, including for a pilot or cockpit crew member on-board an aircraft. The invention more particularly relates to a system and method for ensuring that oxygen gas suitable for breathing is rapidly and intermittently available to a pilot or cockpit crew member on-board an aircraft including during an aircraft's descent. Components of the system include oxygen generators.

Conventional systems and methods for supplying oxygen to an aircraft pilot or cockpit crew member rely on gaseous oxygen contained in cylinders that are stored on-board the aircraft and delivered to pressure and/or flow regulator devices.

There are disadvantages to relying entirely on either a pressurized cylinder of oxygen enriched gas or a chemical oxygen generator. Pressurized cylinders of oxygen enriched gas add significant weight to an oxygen supply system and contribute to its hazard potential by providing an ever-present risk of combustion. Added weight increases fuel costs. Oxygen from pressurized cylinders of gas may be distributed from one or more sources within a distribution network of an aircraft or individual cylinders may be provided for each pilot and cockpit crew member. In either case, given the limited space of an aircraft, oxygen from the cylinders is typically not far from components of the aircraft's illumination system increasing the hazard potential. For example, individual cylinders or outlets of a distribution network above the seats are near the lights. Chemical oxygen generators decrease this hazard potential and reduce the weight of continuously storing pressurized gaseous cylinders but have limited applications. For example, chemical oxygen generators are designed to be usable only a single time for shorter flights (e.g. under about 22 minutes) and their applicability may further depend upon the terrain of the flight path. The need to refill pressurized cylinders and to replace single use chemical oxygen generators increases the maintenance costs for aircraft oxygen supply systems.

A system is known that utilizes molecular sieve bed and/or permeable membrane technology, to produce first, oxygen for use for breathing by an aircrew, and second, nitrogen for use as an inert environment in the fuel tanks of an aircraft. However such systems still require the provision of compressors for both the oxygen, in order that the oxygen can be delivered at an appropriate pressure for breathing, and for the nitrogen. Also, the concentration of oxygen which can be produced is restricted by virtue of the nature of the conventional on-board oxygen generator (OBOG) device technology which is used.

Pressure swing adsorption (PSA) technology is based on the principle that gases under pressure are generally attracted to solid surfaces upon which the gases are adsorbed. Higher pressure results in greater gas adsorption. When the pressure is reduced or swings from high to low, gas is released or desorbed. Gaseous mixtures may be separated through pressure swing adsorption (PSA) because different gases tend to be adsorbed or attracted to different solid materials to varying degrees. Accordingly, when the pressure is reduced gases that are less strongly attracted to the solid materials will be desorbed first to form an outlet stream. After the bed of solid material to which gases are adsorbed reaches its capacity to adsorb, pressure is further reduced to release even the more strongly attracted gases. As applied to an on-board oxygen generator (OBOG), engine bleed air is typically fed into the pressure swing adsorption (PSA) device, the nitrogen component of air is adsorbed to a bed of solid material more strongly than the oxygen component of air, and an outlet stream of enriched oxygen is produced. This is similar to the process used in portable oxygen concentrators for emphysema patients and others who require oxygen enriched air to breathe.

On-board oxygen generators (OBOG) based on pressure swing adsorption (PSA) technology are dependent upon compressed air. On an aircraft this compressed air is typically available as engine bleed air having pressure in the range of 30 to 40 psig and at a temperature in the range of 320 to 380° F. However, in the event engine bleed air or compressed air from an alternative source is not readily available, compressors may be used to pressurize air sufficiently that it is suitable to be received by a pressure swing adsorption (PSA) type on-board oxygen generator (OBOG).

Adsorbents for pressure swing adsorption (PSA) systems must have the ability to discriminate between two or more gases demonstrating selective adsorption. Suitable adsorbent materials for ppressure swing adsorption (PSA) systems are usually very porous materials selected for their large surface areas, for example activated carbon, silica gel, alumina and zeolites. The gas adsorbed on these surfaces may consist of a layer only one or at most a few molecules thick. Adsorbent materials having surface areas of several hundred square meters per gram enable the adsorption of a significant portion of the adsorbent's weight in gas. The molecular sieve characteristics of zeolites and some types of activated carbon called carbon molecular sieves serve to exclude some gas molecules based on size, in addition to the differential adsorption selectivity for different gases.

Oxygen for breathing generated by on-board oxygen generator (OBOG) devices typically is not rapidly available due to the required cycling through membranes. While ceramic oxygen generator (COG) devices typically are superior to molecular sieve oxygen generator (MSOG) devices based upon an ability to provide purer or more highly concentrated oxygen-enriched gas at pressure, oxygen from ceramic oxygen generator (COG) devices is also not rapidly available due to the high temperature requirement necessary for oxygen generation from such devices. It would be desirable to provide a system that leverages the advantages of on-board oxygen generators (OBOG), including ceramic oxygen generator (COG) devices incorporating existing solid electrolyte oxygen separation (SEOS) technology and molecular sieve oxygen generator (MSOG) devices incorporating pressure swing adsorption (PSA) technology, without sacrificing availability of breathable oxygen gas in the short-term during descent or upon an emergency situation arising by integrating other components capable of providing high purity oxygen in the short-term.

It would also be desirable to provide a system incorporating a molecular sieve oxygen generator (MSOG) device that utilizes pressure swing adsorption (PSA) technology to supply sufficiently oxygen enriched air at holding altitudes below 30,000 feet. The ability to rely on molecular sieve oxygen generator (MSOG) devices to supply oxygen below 30,000 feet may also reduce the cost of electricity and heating for the ceramic oxygen generator (COG) devices that produce more highly enriched oxygen gas (about 99% pure) required for altitudes of 30,000 feet and up.

It would further be desirable to provide a system that includes a controller for managing the supply of oxygen from the various sources in the system to ensure a prompt, rich supply of oxygen is available, to maximize efficiency of oxygen usage, and to recycle or store for future use gaseous products that are not needed in the short-term.

Heavy pressurized oxygen cylinders and single use chemical oxygen generators contribute to the maintenance costs of aircrafts reliant upon these oxygen sources. It would be highly advantageous to reduce reliance on pressurized gaseous oxygen cylinders and chemical oxygen generators by reserving their usage to emergency and descent situations before oxygen enriched gas from an on-board oxygen generator (OBOG) device is available.

Finally, it would be advantageous to conserve oxygen that is available or generated by providing oxygen to the masks of passengers or crew through a pulsed supplier with a feedback mechanism such that oxygen flow is only provided as needed. The present invention meets these and other needs.

SUMMARY OF THE INVENTION

The present invention provides a system for rapidly and intermittently supplying oxygen enriched gas suitable for breathing. According to one aspect of the present invention, the system is designed to meet the needs of the pilot(s) and cockpit crew of an aircraft, including during both descent and holding altitude modes and upon an emergency situation arising.

According to a first aspect of several aspects, the present invention provides a system for providing regulated flow of oxygen, for a pilot or a cockpit crew member on an aircraft. The system includes a first on-board oxygen supplier configured to rapidly supply oxygen during an initial stage, a second on-board oxygen supplier configured to supply oxygen during a subsequent stage, and a controller configured to control the first on-board oxygen supplier and the second on-board oxygen supplier. An altitude of an aircraft at the initial stage of oxygen supply from the first on-board oxygen supplier is typically greater than 30,000 feet. In this system the second on-board oxygen supplier may include a molecular sieve oxygen generator and/or a solid electrolyte oxygen separator. In another aspect, the second on-board oxygen supplier may include a ceramic oxygen generator and/or a pressure swing adsorption oxygen generator. In another aspect, the second on-board oxygen supplier may include a permeable membrane. In another aspect, the first on-board oxygen supplier may include a pressurized oxygen cylinder and/or a chemical oxygen generator. The first on-board oxygen supplier is typically configured to supply a first gas stream having an oxygen concentration of 95% or greater.

In addition to the on-board oxygen suppliers, the system may further include a pulsed oxygen delivery subsystem connected to both the first on-board oxygen supplier and the second on-board oxygen supplier. The pulsed oxygen delivery subsystem is configured to regulate flow of oxygen to a pilot or cockpit crew member based on a sensed breathing pattern and physiological requirements. The system typically also includes one or more breathing masks connected to the pulsed oxygen delivery subsystem, and the one or more breathing masks are typically configured to supply oxygen through the breathing mask from the pulsed oxygen delivery subsystem to a pilot or a cockpit crew member. The system may still further include at least one sensor in a communicating relationship with the pulsed oxygen delivery subsystem and configured to sense a pressure drop to indicate an inhalation phase of a breathing cycle of a pilot or a cockpit crew member.

The controller of the system is configured to optimize performance by adjusting at least one or more of the following parameters: a rate of air flow supplied to the first on-board oxygen supplier or to the second on-board oxygen supplier, a temperature of the first on-board oxygen supplier, a temperature of the second on-board oxygen supplier, a pressure of the first on-board oxygen supplier, and a pressure of the second on-board oxygen supplier.

According to a second aspect, the present invention provides a system for providing regulated flow of oxygen, including for a pilot or a cockpit crew member on-board an aircraft, the system including a first on-board oxygen supplier configured to supply oxygen during an initial stage, a second on-board oxygen supplier including at least one on-board oxygen generator, and a controller electrically connected to both the first on-board oxygen supplier and the second on-board oxygen supplier. The controller is preferably configured to control both the first on-board oxygen supplier and the second on-board oxygen supplier. A pulsed oxygen delivery subsystem is preferably connected to the controller, the first on-board oxygen supplier downstream of the first on-board oxygen supplier, and the second on-board oxygen supplier downstream of the second on-board oxygen supplier. One or more breathing masks for a pilot and/or a cockpit crew member are preferably connected to the pulsed oxygen delivery subsystem downstream of the pulsed oxygen delivery subsystem, and the pulsed oxygen delivery subsystem is preferably configured to regulate flow of oxygen to the one or more breathing masks based on sensed breathing patterns and physiological requirements of a pilot and/or a cockpit crew member.

According to a third aspect, the present invention provides a method for providing regulated flow of oxygen, for a pilot or a cockpit crew member on an aircraft. In the method, a first system is activated to initiate an initial flow of oxygen at high altitudes greater than 30,000 feet from a first on-board oxygen supplier selected from the group consisting of: a pressurized oxygen cylinder, a chemical oxygen generator, and a combination of a pressurized oxygen cylinder and a chemical oxygen generator. A second system is then activated to initiate a subsequent flow of oxygen from a second on-board oxygen supplier selected from the group consisting of: a first on-board oxygen generator, a second on-board oxygen generator, and a combination of the first on-board oxygen generator and the second on-board oxygen generator. The first on-board oxygen generator is preferably configured to supply a first gas stream having an oxygen concentration of 90% or greater, and the second on-board oxygen generator is configured to supply a second gas stream having an oxygen concentration of 99% or greater. Oxygen supplied from the second system is integrated with oxygen supplied from the first system. The first system is typically deactivated when the second system is able to meet oxygen supply requirements. A breathing pattern and/or and physiological requirements of a pilot and/or a cockpit crew member is sensed, and a flow of oxygen to one or more breathing masks of a pilot and/or a cockpit crew member is regulated by delivering oxygen to the one or more breathing masks from the first system or the second system through a pulsed oxygen delivery subsystem configured to vary a flow rate of oxygen based on a sensed breathing pattern and physiological requirements.

The system is designed to minimize the weight, volume, and potential combustion risk of the oxygen generators. The system is also designed to conserve usage of oxygen by selectively controlling the supply of oxygen from various sources and the interaction of various components of the system.

The pressurized cylinder of oxygen enriched gas and/or the chemical oxygen generator may be used to rapidly supply oxygen gas suitable for breathing at pressure upon an emergency situation arising or during initial aircraft descent mode.

The system of the invention advantageously includes lighter weight on-board oxygen generator (OBOG) devices to supply oxygen as part of the system together with traditional pressurized cylinders and/or chemical oxygen generators. The amount of oxygen that must be stored in the cylinders or generated by the chemical oxygen generators is reduced to the amount of oxygen necessary to cover the time period from onset of an emergency situation or descent until the secondary supply of oxygen from the on-board oxygen generator (OBOG) device is available based on cycling, for molecular sieve oxygen generators (MSOG), permeable membrane oxygen generators and ceramic oxygen generators (COG), and based on attainment of temperature for ceramic oxygen generators (COG).

The system of the invention is designed to decrease maintenance costs by reducing or eliminating the need for refilling of gaseous oxygen in pressurized cylinders on the ground and reducing or eliminating the need for replacing single use chemical oxygen generators. The system of the invention may accomplish these objectives by storing for future use excess high purity oxygen gas produced from on-board oxygen generator (OBOG) devices. Excess highly oxygen enriched gas beyond that required to satisfy the immediate needs of the pilot or cockpit crew for breathing may be fed into a pressurized cylinder or other emergency supply reservoir.

The system of the invention detects when a pilot or cockpit crew member inhales through their breathing mask and initiates or resumes the flow of oxygen to their mask upon detecting inhalation.

Other features and advantages of the present invention will become apparent from the following detailed description, taken in conjunction with the accompanying drawings, which illustrate, by way of example, the principles of the invention.

DETAILED DESCRIPTION OF THE PREFERRED EMBODIMENTS

The present invention provides a system and method for generating, supplying and maintaining adequate reserves of oxygen. One preferred application for the present invention is to provide oxygen for pilots and/or cockpit crew on-board an aircraft including at high altitudes above 30,000 feet, during descent, at holding altitudes below 30,000 feet, on flight paths over variable terrain, and on flights of any duration. The present invention offers several advantages for providing oxygen to pilots and cockpit crew on both business jets and commercial aircrafts.

Maintaining adequate reserves of oxygen may be accomplished by storing excess oxygen generated for future use through refilling emergency reserves. Conservation of available oxygen by more closely matching oxygen supplied from the system to oxygen demand by pilots and cockpit crew also assists with maintenance of adequate reserves.

Figure 1:
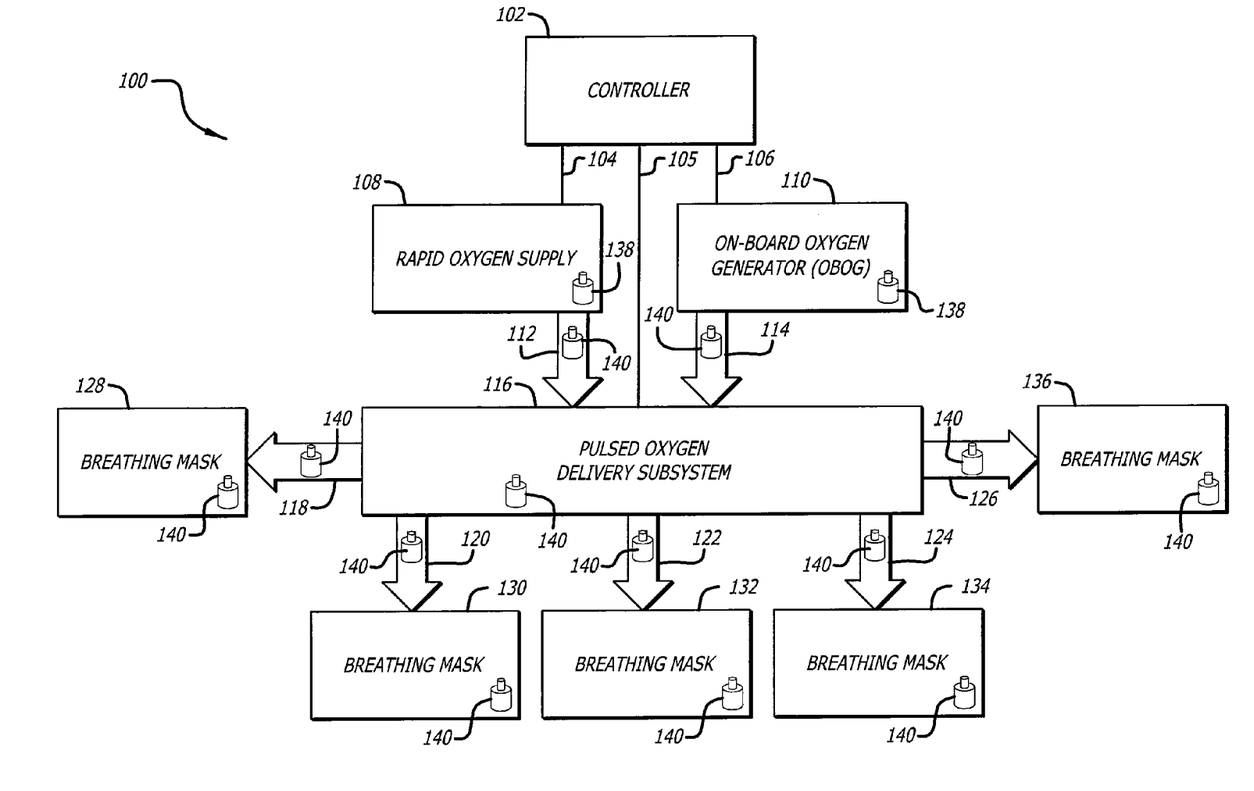
FIG. 1 is a schematic diagram illustrating integration of traditional and contemporary oxygen supply systems through a common controller in accordance with an aspect of the present invention.

As shown in FIG. 1, in a presently preferred embodiment, components of the system 100 for providing a regulated flow of oxygen for a pilot and/or cockpit crew member on an aircraft include a controller 102 connected to and configured to control a rapid oxygen supply 108, an on-board oxygen generator 110, and a pulsed oxygen delivery subsystem 116.

Typically, a line 104 is provided electrically connecting the controller to the rapid oxygen supplier, a line 106 is provided electrically connecting the controller to the on-board oxygen generator, and a line 105 is provided electrically connecting the controller to the pulsed oxygen delivery subsystem, although these components may alternatively be wirelessly electrically connected.

The controller is in electrical communication with each oxygen source and a decompression relay. More specifically, the controller is in communication with an electrically operated on/off inlet solenoid valve between each oxygen source and each breathing mask or the pulsed oxygen delivery subsystem supplying oxygen to the masks. The controller is also in electrical communication with a cabin air pressure transducer for generating a cabin air pressure input signal representing the cabin pressure and a corresponding altitude.

The controller is preferably configured to optimize performance by adjusting at least one of the following parameters: a rate of air flow supplied to the first on-board oxygen supplier or to the second on-board oxygen supplier, a temperature of the first on-board oxygen supplier, a temperature of the second on-board oxygen supplier, a pressure of the first on-board oxygen supplier, and a pressure of the second on-board oxygen supplier.

A feed line 112 also connects the rapid oxygen supply to the pulsed oxygen delivery subsystem, and another feed line 114 connects the on-board oxygen generator to the pulsed oxygen delivery subsystem, connected in fluid communication with a plurality of breathing masks 128, 130, 132, 134, 136 for each pilot and/or cockpit crew member (typically with a reservoir bag attached to each breathing mask), and low pressure tubing 118, 120, 122, 124, 126 connects each mask to a source of oxygen.

The rapid oxygen supply 108 preferably includes at least one of a pressurized cylinder of oxygen enriched gas or a chemical oxygen generator.

The on-board oxygen generator (OBOG) 110 preferably includes at least one of a ceramic oxygen generator (COG) type on-board oxygen generator (OBOG) incorporating solid electrolyte oxygen separation (SEOS) technology, a molecular sieve oxygen generator (MSOG) type on-board oxygen generator (OBOG) incorporating pressure swing adsorption (PSA) technology, or a permeable membrane type oxygen generator that relies upon the selective permeability of membranes to separate constituents of a gaseous mixture.

The pulsed oxygen delivery subsystem 116 may include one or more pulsed oxygen suppliers such as a manifold or reservoir with inlets for receiving the oxygen supplied and one or more solenoid valve controlled outlets connected to the feed lines to the one or more breathing masks, for example, for intermittently providing flow of oxygen to the individual breathing masks.

The ceramic oxygen generator (COG) type of device advantageously typically produces highly enriched oxygen gas (substantially 100% $O_2$) at pressure suitable for breathing, thereby reducing or eliminating the need for compressors which take up space and add weight.

Ceramic membranes for separating oxygen from a supply stream of air use the catalytic properties of the interior surfaces of specialized ceramic materials to ionize and then separate oxygen. As applied on aircraft, the supply stream of air for the ceramic oxygen generator (COG) type on-board oxygen generator (OBOG) device is typically engine bleed air. However, the supply gas for the ceramic oxygen generator (COG) type on-board oxygen generator (OBOG) device may come from other sources. For example, the supply gas may come from the product stream of another on-board oxygen generator (OBOG) device, such as a ceramic oxygen generator (COG) or molecular sieve oxygen generator (MSOG) for example.

Given the ability of ceramic oxygen generator (COG) type on-board oxygen generator (OBOG) devices to perform more efficiently with input streams more highly concentrated in oxygen, it may be particularly advantageous to have another on-board oxygen generator (OBOG) device upstream of the ceramic oxygen generator (COG) device to increase the oxygen concentration in the supply stream fed to the ceramic oxygen generator (COG) device beyond the oxygen concentration of the alternative supply stream, engine bleed air. In another presently preferred aspect, a gas separator device can be provided upstream of the ceramic oxygen generator (COG) device to provide more highly enriched oxygen gas to the ceramic oxygen generator (COG) device compared to air alone which comprises approximately 21% oxygen. This additional gas separator may be, for example, another ceramic oxygen generator (COG) or a molecular sieve oxygen generator (MSOG) that feeds its product stream to the ceramic oxygen generator (COG).

Alternatively, this additional gas separator may be an on-board inert gas generator (OBIGG) that feeds its residual stream to the ceramic oxygen generator (COG). When an on-board inert gas generator (OBIGG) device is used, it is known that with air as the supply stream the oxygen rich residual stream is not suitable for breathing. However, feeding this residual stream to a ceramic oxygen generator (COG) device would produce air suitable for breathing and would result in the ceramic oxygen generator (COG) device operating more efficiently than if unprocessed air was used as the supply stream.

The oxygen ionization process at high surface temperatures is partly responsible for generation of a product gas from the ceramic membrane type on-board generators that is virtually 100% pure oxygen with no possibility for the presence of biological or toxic chemical components. Ceramic operating temperatures are around 700° C. and the electrical potential difference across the membrane is on the order of a volt. Ceramic membrane oxygen generators are one preferred subset of ion transport membrane technologies.

Ceramic membrane oxygen generator devices have at least three advantageous properties: no moving parts, immunity to supply air contaminants, and detectable deterioration and failure. The lack of moving parts increases reliability and is particularly desirable for aerospace applications. The disaffectedness to supply air contaminants enhances safety and improves product life as all other known air separation technologies suffer sensitivity to supply air contamination or moisture. The performance integrity of ceramic membrane devices is superior to the operational variability of other separation devices affected by minor constituents of air, contaminants, and moisture. The ability to promptly detect if and when the performance of the ceramic membrane separation device is falling off or the device is near the end of its product life is highly desirable for applications that impact human lives. A drop in output oxygen pressure is an indicator of the need for replacement for ceramic membrane devices. These devices commonly have oxygen output pressures around 2000 psia when performing properly.

The highly enriched oxygen gas produced by the ceramic oxygen generator (COG) device is suitable for breathing at higher altitudes above 30,000 feet whereas more moderately enriched oxygen gas produced by other types of on-board oxygen generator (OBOG) devices, including molecular sieve oxygen generator (MSOG) devices, is not suitable for breathing at higher altitudes but only for holding altitudes below 30,000 feet. Further, oxygen enriched gas from molecular sieve oxygen generator (MSOG) devices requires pressurizing by compressors before it is suitable for breathing. Highly enriched oxygen gas from the ceramic oxygen generator (COG) device may be used directly for breathing at any altitude after waiting for attainment of the high temperature requirement necessary to the production of such gas.

If the ceramic oxygen generator (COG) device is heated by supplying electrical voltage to the ceramic separator before an emergency arises, for example on the ground or just after takeoff, highly oxygen enriched gas from the ceramic oxygen generator (COG) device may be rapidly available if an emergency situation arises. One example of an emergency situation is cabin decompression. Highly enriched oxygen gas from the ceramic oxygen generator (COG) device may also be used to refill emergency reserves when not needed to meet current needs. In turn, highly enriched oxygen gas from ceramic oxygen generator (COG) devices that is stored in emergency reserves may be utilized rapidly in emergency situations at any altitude to cover the initial period until highly enriched oxygen gas recently produced by the ceramic oxygen generator (COG) device becomes available given the cycling period and heating requirement. This would be the protocol in situations when the ceramic oxygen generator (COG) device is not turned on until an emergency arises.

It may be expensive and unnecessary to power on the ceramic oxygen generator (COG) device on the ground or just after takeoff on every flight before an emergency situation arises. In any case, the standby availability of the ceramic oxygen generator (COG) device on-board the aircraft still provides the advantage of reducing reliance on pressurized gas cylinders and chemical oxygen generators. Smaller pressurized gas cylinders may be provided if ceramic oxygen generator (COG) type on-board oxygen generator (OBOG) devices are available. Additionally, the oxygen generated by the ceramic oxygen generator (COG) devices may be used to refill the smaller pressurized cylinders thereby reducing maintenance costs. Compared to molecular sieve oxygen generator (MSOG) type on-board oxygen generator (OBOG) devices, oxygen enriched air from ceramic oxygen generator (COG) devices provides the advantage of being generated at pressure to reduce reliance on compressors.

Ceramic oxygen generator (COG) devices utilize solid electrolyte oxygen separation (SEOS) technology in which oxygen is catalytically separated from air inside specialized ceramic materials at high temperatures, about 650° C. to 750° C., using electrical voltage. While this process produces substantially pure oxygen gas product at pressure and suitable for breathing at any altitude, including higher altitudes over 30,000 feet, the drawback is that the oxygen is not promptly available upon powering on the device because it has to reach the required temperature first.

By incorporating this ceramic oxygen generator (COG) device and existing solid electrolyte oxygen separation (SEOS) technology as a component in a system with other components that can supply oxygen rapidly and managing the supply of oxygen among the components, the present invention overcomes this drawback. For example, pressurized cylinders of highly oxygen enriched gas (about 99% oxygen and above) or chemical oxygen generators may supply oxygen for about the first 5-10 minutes upon an emergency situation arising. After the first 5-10 minutes it is likely that the aircraft will have descended below 30,000 feet at which point a molecular sieve oxygen generator (MSOG) type on-board oxygen generator (OBOG) can be relied upon to supply more moderately enriched oxygen gas (90-95%) suitable for breathing at lower altitudes. Alternatively, after the first 5-10 minutes if the aircraft has not descended sufficiently to switch the oxygen supply source to the molecular sieve oxygen generator (MSOG), it is likely that by that time the ceramic oxygen generator (COG) type on-board oxygen generator (OBOG) device will be ready to utilize, having attained the necessary temperature requirement and sufficiently cycled.

Partial reliance on molecular sieve oxygen generator (MSOG) type on-board oxygen generator (OBOG) devices incorporating pressure swing adsorption (PSA) rather than solid electrolyte oxygen separation (SEOS) technology overcomes the heating requirement of ceramic oxygen generator (COG) type devices. With the different options for oxygen generation and supply provided by the present invention, the appropriate ratio of oxygen from any combination of sources may be provided to optimize safety, efficiency, and reliability while minimizing cost as impacted by heating and electricity requirements, on-board oxygen generator (OBOG) device separator materials (zeolites, ceramics, polymeric membranes, and the like), weight, storage space, and other factors.

Using current zeolite based technology it is relatively easy to produce a gaseous stream having 90-95% oxygen. At altitudes below 30,000 feet where a 95% oxygen stream is suitable for breathing it may make sense to switch from a ceramic oxygen generator (COG) oxygen supply to a molecular sieve oxygen generator (MSOG) oxygen supply even though the molecular sieve oxygen generator (MSOG) outgoing product stream requires pressurization before it is suitable for breathing. This may allow the ceramic oxygen generator (COG) device to be put on standby or powered off to conserve energy. If the aircraft later ascends to an altitude above 30,000 fee where a 99% or greater oxygen stream is required the oxygen supply to the breathing masks can be switched back over to the ceramic oxygen generator (COG) source.

The controller preferably coordinates the supply of oxygen from the rapid oxygen supply and the on-board oxygen supply sources to the one or more pulsed oxygen suppliers that feed one or more individual breathing masks. The controller is able to determine what quality of oxygen is required based on altitude and what sources of oxygen are available. The controller manages the oxygen supplies as necessary to meet the demands of pilots and cockpit crew while maintaining adequate reserves. For example, upon an emergency situation arising at high altitude greater than 30,000 feet, if oxygen from a ceramic oxygen generator (COG) device is not available because the ceramic oxygen generator (COG) device was not turned on until the emergency situation arose, the controller can direct a pressurized cylinder or chemical oxygen generator to promptly supply oxygen. Upon the ceramic oxygen generator (COG) device attaining operation temperature of 650° C. to 750° C. and cycling, the controller can sense the presence of highly enriched oxygen available from the ceramic oxygen generator (COG) device, add this to the supply stream from the pressurized cylinder or chemical oxygen generator, and phase out supply from the pressurized cylinder or chemical oxygen generator once the ceramic oxygen generator (COG) type on-board oxygen generator (OBOG) device is able to adequately meet demand.

As part of the control system, in addition to the controller, a plurality of sensors 138 and detectors connected to each of the oxygen sources, respectively, may be provided to determine volume available and oxygen concentration. Another sensor or detector (not shown) in a communicating relationship with the controller typically reads altitude. Additional sensors 140 and detectors may be provided within individual breathing masks or along any of the feed lines to or from the breathing masks, or within the pulsed oxygen delivery subsystem, or along any of the feed lines to or from the pulsed oxygen delivery subsystem for example, to monitor other variables including oxygen usage rates.

According to one embodiment, the system includes at least one sensor in a communicating relationship with the pulsed oxygen delivery subsystem, the sensor configured to sense a pressure drop, for example a pressure drop in a feed line connecting the pulsed oxygen delivery subsystem to a breathing mask, to indicate an inhalation phase of a breathing cycle of a pilot or a cockpit crew member.

Other components may be incorporated in different embodiments but are not required. For example, other components may include: a decompression relay, one or more additional relays, an electrically operated on/off inlet valve between each oxygen source and each of the feed lines from the oxygen supplier to each breathing mask, one or more pressure transducers, and one or more sensors or detectors in any of the breathing masks, the pulsed oxygen delivery subsystem, the oxygen sources, or along the feed lines or low pressure tubing through which oxygen is supplied.

Other components of the system may include cooling or heating devices, for example along the feed lines, to ensure enriched oxygen gas from the oxygen generator (particularly the high temperature ceramic oxygen generator (COG) device) is supplied to the breathing masks of pilots and cockpit crew at the appropriate temperature compatible with physiological preferences or requirements.

In addition to the components discussed above, the present invention may also incorporate additional on-board oxygen generator (OBOG) or on-board inert gas generator (OBIGG) devices in any series, combination, or orientation to produce desirable effects including maintenance of an adequately enriched oxygen supply for breathing in the short-term, refilling emergency oxygen supplies, providing sufficient inert gas streams to fill voids in the fuel tank and keep pace with the fuel combustion rate, and the like.

According to one embodiment, the present invention provides a method for providing regulated flow of oxygen, for a pilot or a cockpit crew member on an aircraft. In accordance with the method, a first system is activated to initiate an initial flow of oxygen at high altitudes greater than 30,000 feet from a first on-board oxygen supplier. The first on-board oxygen supplier may be a pressurized oxygen cylinder, a chemical oxygen generator, or a combination of a pressurized oxygen cylinder and a chemical oxygen generator. A second system is also activated to initiate a subsequent flow of oxygen from a second on-board oxygen supplier. The second on-board oxygen supplier may be a first on-board oxygen generator, a second on-board oxygen generator, or a combination of the first on-board oxygen generator and the second on-board oxygen generator. The first on-board oxygen generator is configured to supply a first gas stream having an oxygen concentration of 90% or greater and the second on-board oxygen generator is configured to supply a second gas stream having an oxygen concentration of 99% or greater. The method further involves integrating oxygen supplied from the second system with oxygen supplied from the first system and deactivating the first system when the second system is able to meet oxygen supply requirements. The method also includes sensing the breathing pattern of a pilot or a cockpit crew member and regulating flow of oxygen to a breathing mask of a pilot or a cockpit crew member. Oxygen flow may be regulated by delivering oxygen to the mask from the first system or the second system through a pulsed oxygen delivery subsystem configured to vary a flow rate of oxygen based on a sensed breathing pattern and physiological requirements.

The present invention is not limited to the embodiments described above. Various changes and modifications can, of course, be made, without departing from the scope and spirit of the present invention. Additional advantages and modifications will readily occur to those skilled in the art. Accordingly, various modifications may be made without departing from the spirit or scope of the general inventive concept as defined by the appended claims and their equivalents.

What is claimed is:

1. A system for providing regulated flow of oxygen, for a pilot or a cockpit crew member on an aircraft, comprising:
   a first on-board oxygen supplier configured to supply oxygen during an initial stage, said first on-board oxygen supplier including a combination of a pressurized oxygen cylinder and a chemical oxygen generator;
   at least one first oxygen source sensor connected to said first on-board oxygen supplier configured to determine an available oxygen volume and an oxygen concentration of oxygen in said first on-board oxygen supplier;
   a second on-board oxygen supplier configured to supply oxygen during a subsequent stage, wherein the second on-board oxygen supplier comprises a combination of a molecular sieve oxygen generator incorporating pressure swing adsorption, and at least one of a ceramic oxygen generator incorporating a solid electrolyte oxygen separator, and a pressure swing adsorption oxygen generator;
   a second oxygen source sensor connected to said second on-board oxygen supplier configured to determine an oxygen concentration of oxygen supplied by said second on-board oxygen supplier;
   a pulsed oxygen delivery subsystem connected to the first on-board oxygen supplier by a first feed line and connected to the second on-board oxygen supplier by a second feed line and configured to receive oxygen supplied by said first on-board oxygen supplier and said second on-board oxygen supplier;
   a first oxygen usage sensor disposed in said first feed line connected between said first on-board oxygen supplier and said pulsed oxygen delivery subsystem, said first oxygen usage sensor being configured to measure a rate of usage of oxygen from said first on-board oxygen supplier;
   a second oxygen usage sensor disposed in said second feed line connected between said second on-board oxygen supplier and said pulsed oxygen delivery subsystem, said second oxygen usage sensor being configured to measure a rate of usage of oxygen from said second on-board oxygen supplier; and
   a controller configured to control the first on-board oxygen supplier and the second on-board oxygen supplier based on the rates of usage of oxygen from said first and second on-board oxygen suppliers, said available oxygen volume and oxygen concentration in said first on-board oxygen supplier, and said oxygen concentration of oxygen supplied by said second on-board oxygen supplier.

2. The system of claim 1, wherein the first on-board oxygen supplier is configured to supply a first gas stream having an oxygen concentration of 95% or greater.

3. The system of claim 1, wherein said pulsed oxygen delivery subsystem is configured to regulate flow of oxygen to a pilot or cockpit crew member based on a sensed breathing pattern and physiological requirements.

4. The system of claim 3, further comprising a breathing mask connected to the pulsed oxygen delivery subsystem, the breathing mask configured to supply oxygen through the breathing mask from the pulsed oxygen delivery subsystem to a pilot or a cockpit crew member.

5. The system of claim 4, further comprising at least one sensor in a communicating relationship with the pulsed oxygen delivery subsystem, the sensor configured to sense a pressure drop to indicate an inhalation phase of a breathing cycle of a pilot or a cockpit crew member.

6. The system of claim 1, wherein the controller is configured to optimize performance by adjusting at least one of the following parameters: a rate of air flow supplied to the first on-board oxygen supplier or to the second on-board oxygen supplier, a temperature of the first on-board oxygen supplier, a temperature of the second on-board oxygen supplier, a pressure of the first on-board oxygen supplier, and a pressure of the second on-board oxygen supplier.

7. A system for providing regulated flow of oxygen, including for a pilot or a cockpit crew member on-board an aircraft, comprising:
   a first on-board oxygen supplier configured to supply oxygen during an initial stage, said first on-board oxygen supplier including a combination of a pressurized oxygen cylinder and a chemical oxygen generator;
   at least one first oxygen source sensor connected to said first on-board oxygen supplier configured to determine an available oxygen volume and oxygen concentration of oxygen in said first on-board oxygen supplier;
   a second on-board oxygen supplier including a plurality of on-board oxygen generators, wherein the second on-board oxygen supplier comprises a combination of a molecular sieve oxygen generator incorporating pressure swing adsorption, and at least one of a ceramic oxygen generator incorporating a solid electrolyte oxygen separator, and a pressure swing adsorption oxygen generator;
   a second oxygen source sensor connected to said second on-board oxygen supplier configured to determine an oxygen concentration of oxygen supplied by said second on-board oxygen supplier;
   a controller electrically connected to both the first on-board oxygen supplier and the second on-board oxygen supplier, the controller configured to control both the first on-board oxygen supplier and the second on-board oxygen supplier;
   a pulsed oxygen delivery subsystem connected to the first on-board oxygen supplier, the second on-board oxygen supplier, and the controller, and downstream of the first on-board oxygen supplier and the second on-board oxygen supplier;

a first oxygen usage sensor disposed in a first feed line connected between said first on-board oxygen supplier and said pulsed oxygen delivery subsystem, said first oxygen usage sensor being configured to measure a rate of usage of oxygen from said first on-board oxygen supplier;

a second oxygen usage sensor disposed in a second feed line connected between said second on-board oxygen supplier and said pulsed oxygen delivery subsystem, said second oxygen usage sensor being configured to measure a rate of usage of oxygen from said second on-board oxygen supplier; and a breathing mask for a pilot or a cockpit crew member connected to and downstream of the pulsed oxygen delivery subsystem, said breathing mask including a breathing mask oxygen usage sensor provided within said breathing mask and connected to said pulsed oxygen delivery subsystem, said breathing mask oxygen usage sensor being configured to measure oxygen usage rates within said breathing mask, and wherein the pulsed oxygen delivery subsystem is configured to regulate flow of oxygen to the breathing mask based on a sensed breathing pattern and physiological requirements of a pilot or a cockpit crew member, oxygen usage rates within said breathing mask, the rates of usage of oxygen from said first and second on-board oxygen suppliers, said available oxygen volume and oxygen concentration in said first on-board oxygen supplier, and said oxygen concentration of oxygen supplied by said second on-board oxygen supplier.

* * * * *